US007562896B2

(12) United States Patent
Murayama

(10) Patent No.: US 7,562,896 B2
(45) Date of Patent: Jul. 21, 2009

(54) BODY FRAME FOR WHEELCHAIR

(75) Inventor: Tamio Murayama, Kobe (JP)

(73) Assignee: Kawamura-Cycle Co., Ltd., Kobe-Shi, Hyogo (JP)

(*) Notice: Subject to any disclaimer, the term of this patent is extended or adjusted under 35 U.S.C. 154(b) by 665 days.

(21) Appl. No.: 11/266,306

(22) Filed: Nov. 4, 2005

(65) Prior Publication Data

US 2007/0102901 A1 May 10, 2007

(51) Int. Cl.
*B62B 3/02* (2006.01)

(52) U.S. Cl. ...................... 280/647; 280/650; 280/657; 280/47.38

(58) Field of Classification Search ................. 280/642, 280/643, 644, 647, 648, 649, 650, 657, 658, 280/47.38, 47.4, 47.41

See application file for complete search history.

(56) References Cited

U.S. PATENT DOCUMENTS 4,989,890 A * 2/1991 Lockard et al. ............... 280/42
5,294,141 A 3/1994 Mentessi et al.
6,185,769 B1 * 2/2001 Larisey et al. .................. 5/648
6,588,792 B1 * 7/2003 Koerlin et al. .............. 280/650
7,014,204 B2 * 3/2006 Meyers et al. ............ 280/304.1
2004/0080190 A1 * 4/2004 Markwald .................... 297/61
2004/0227331 A1 * 11/2004 Chen et al. .................. 280/650

FOREIGN PATENT DOCUMENTS

JP 53-133844 A 11/1978
JP 09-122180 A 5/1997
JP 2000-166975 A 6/2000
JP 2001-149413 A 6/2001
JP 2003-190222 A 7/2003

* cited by examiner

*Primary Examiner*—Christopher P Ellis
*Assistant Examiner*—John D Walters
(74) *Attorney, Agent, or Firm*—Birch, Stewart, Kolasch & Birch, LLP

(57) ABSTRACT

A body frame (10) for a wheelchair includes a main frame (11), a back frame (12) and a seat frame (13). The body frame (10) includes hinge structures (31), (38), (53) and (56) for causing the user of a wheelchair to lie down, and cross braces (15) and (16) for implementing the fold of the wheelchair. The hinge structures (31), (38), (53) and (56) are provided so that the main frame (11) and the seat frame (13) are divided in a longitudinal direction. The center of each of the hinge structures (31), (38), (53) and (56) is present on an identical virtual axis in a transverse direction. The cross braces (15) and (16) are disposed before each of the hinge structures (31), (38), (53) and (56).

10 Claims, 16 Drawing Sheets

BODY FRAME FOR WHEELCHAIR

BACKGROUND OF THE INVENTION

1. Field of the Invention

The present invention relates to a structure of a body frame to be employed for a wheelchair to be utilized in the disabled, the aged, the wounded and the like.

2. Description of the Related Art

A wheelchair is not utilized as a simple chair for seating but as moving means in place of walking for a person having difficulty in the walking. It is important that the user can comfortably use the wheelchair. Therefore, a reclining seat is provided on the wheelchair in some cases (for example, Japanese Laid-Open Patent Publication No. 2003-190222). A conventional reclining seat in a wheelchair includes a seat and a back provided behind the seat. When a user lies down, the back is inclined rearward.

In the conventional reclining seat, the back is only inclined toward the seat. For this reason, in the case in which the back is inclined and set up again in a state in which the user sits on the wheelchair, the hip portion of the user is shifted with respect to the seat. In this case, there is a problem in that the user feels tired.

In the case in which the user goes far away, the wheelchair itself can be desirably loaded onto a car or the like. In the case in which the wheelchair is not used, it is desirable that the wheelchair should be folded to be compact.

SUMMARY OF THE INVENTION

The present invention has been made in such a background. It is an object of the present invention to provide a body frame for a wheelchair which can freely regulate the posture of a user and can be folded to be compact.

The present invention provides a body frame for a wheelchair having a member for dividing a seat and a member provided on the member for dividing a seat and serving to divide a back. The member for dividing a seat is divided into a front member and a rear member through a hinge structure. The body frame is constituted in such a manner that the rear member is inclined to the front member so that a rear part of the seat and the back are inclined.

In the present invention, when the user for the wheelchair lies down, the hip portion of the user sinks and the back of the user is inclined rearward. In this wheelchair, the hip portion of the user can be prevented from being shifted with respect to the seat. When the user for the wheelchair sets up a body, the hip portion of the user is moved to an upper part and the back rises. In this case, the hip portion of the user can be prevented from being shifted with respect to the seat.

In the body frame, the members for dividing the seat are provided opposite to each other in a transverse direction. There is provided a main frame including a pair of members for supporting the member for dividing each seat respectively. A cross brace formed like X in a rotatable state is provided between the member for dividing a seat and the member for supporting the same, and the member for dividing a seat and the member for supporting the same are thus provided to be foldable in a transverse direction.

In the body frame, the cross brace couples the main frame to the member for dividing each seat. When each cross member is rotated, therefore, the member for dividing each seat and the member for supporting the same can approach each other in the transverse direction. The main frame and the member for dividing the seat are folded in the transverse direction.

In the body frame, the cross brace is provided before the hinge structure. A structure (folding structure) for folding the main frame and the member for dividing the seat and a structure (reclining structure) for inclining the rear part of the seat and the back are constituted separately and independently. In the body frame, the folding structure and the reclining structure can be implemented by a simple structure.

Another body frame for a wheelchair according to the present invention comprises a main frame having a pair of upper bones provided opposite to each other in a transverse direction and extended in a longitudinal direction and a pair of lower bones provided in parallel with the upper bones below the upper bones, a seat frame having a pair of seat rails provided along the upper bones and constituting a seat by an attachment of a seat member, a back frame having a pair of back rails provided on rear ends of the upper bones and constituting a back by an attachment of the seat member, a cross brace including one of cross members having one of ends coupled to a predetermined portion of one of the seat rails and the other end coupled to a predetermined portion of one of the lower bones and the other cross member having one of ends coupled to a predetermined portion of the other seat rail and the other end coupled to a predetermined portion of the other lower bone, the mutual cross members being coupled rotatably in centers thereof and being thus formed like X, and a support structure for supporting the seat frame in order to maintain a positional relationship of the main frame with the seat frame. Each of the upper bones is divided into a fore upper bone and a hind upper bone. The hind upper bone is coupled to the fore upper bone through a first hinge structure in order to be freely inclined to the fore upper bone. Each of the seat rails is divided into a fore seat rail and a hind seat rail. The hind seat rail is coupled to the fore seat rail through a second hinge structure in order to be freely inclined to the fore seat rail. The cross brace is disposed before both the first hinge structure and the second hinge structure.

In the present invention, the back frame is provided on the upper bone of the main frame. When the hind upper bone to be coupled to the fore upper bone through the first hinge structure falls downward, therefore, the back is inclined rearward. On the other hand, referring to the seat frame, when the hind seat rail to be coupled to the fore seat rail through the second hinge structure falls downward, the rear part of the seat sinks. In the body frame, the rear part of the seat sinks, and furthermore, the back is inclined rearward.

In the body frame, the upper bones making a transverse pair, the lower bones making a transverse pair and the seat rails making a transverse pair are coupled to each other through the cross brace formed like X. When the cross angle of the cross members is changed, a distance in the transverse direction between the upper bones is changed. When the cross angle of the cross members is changed, a distance in the transverse direction between the lower bones is changed. When the cross angle of the cross members is changed, a distance in the transverse direction between the seat rails is changed. Accordingly, the body frame is folded in the transverse direction.

The seat frame is coupled to the main frame through the support structure. When the body frame is folded in the transverse direction, therefore, the positional relationship of the seat frame with the main frame is maintained. In other words, the position of the seat frame with respect to the main frame can be prevented from being displaced freely. The body frame can easily be folded.

In the body frame, the cross brace is provided before each hinge structure. Therefore, the structure (reclining structure) for causing the user for the wheelchair to lie down and the structure (folding structure) for folding the wheelchair are constituted separately and independently. In the body frame, the folding structure and the reclining structure can be implemented with a simple structure.

In the body frame, the first hinge structure includes a front block provided on a rear end of the fore upper bone, a back block provided on a front end of the hind upper bone, and a coupling pin for coupling both of them. An engagement shaft portion protruded along a rotating axis of the hind upper bone is formed on either the front block or the back block. An engagement dent is provided along the rotating axis on either the remaining front block or the remaining back block. The engagement shaft portion is fitted in the engagement dent in a direction of the rotating axis.

In the body frame, a high stiffness can be maintained in the first hinge structure having the engagement shaft portion fitted in the engagement dent. The hind upper bone is rotated accurately without a twist with respect to the fore upper bone. In the case in which the rear part of the seat sinks and the back is inclined rearward, there is an advantage that the body frame is not twisted.

In the body frame, the front block and the back block are coupled to each other like a shiplap along the rotating axis. When both of the front and back blocks are coupled like a shiplap, there is an advantage that the stiffness of the first hinge structure is further increased.

In the body frame, a rotating axis of the first hinge structure is coincident with that of the second hinge structure. A position in which the rear part of the seat is bent is coincident with a position in which the main frame is bent. When lying down, accordingly, the user for the wheelchair employing the body frame can be prevented from feeling uncomfortable.

In the body frame, the support structure has a coupling pipe provided in a vertical direction and coupled to the lower bone, and a coupling rod inserted through the coupling pipe and coupled to the seat rail at an upper end thereof.

In the body frame, the coupling rod is present in the coupling pipe in a state in which a displacement can be carried out in a vertical direction. With a simple structure having the coupling pipe and the coupling rod, there is an advantage that the positional relationship between the main frame and the seat frame is held.

In the body frame, a portion of the seat rail to be coupled to the cross brace includes an inserting pipe and an inserted rod to be inserted through the inserting pipe. The inserting pipe is constituted to be rotated around an axis of the inserted rod.

In such a body frame, the inserting pipe is rotated in such a manner that a change in the cross angle of the cross members can be offset.

A further body frame for a wheelchair according to the present invention comprises a main frame having a pair of upper bones provided opposite to each other in a transverse direction and extended in a longitudinal direction and a pair of lower bones provided in parallel with the upper bones below the upper bones, a seat frame having a pair of seat rails provided along a forward part of the upper bones and constituting a forward part of a seat by an attachment of a seat member, a back frame having a pair of back rails provided on rear ends of the upper bones and constituting a back by an attachment of a seat member, a cross brace including one of cross members having one of ends coupled to a predetermined portion of one of the seat rails and the other end coupled to a predetermined portion of one of the lower bones and the other cross member having one of ends coupled to a predetermined portion of the other seat rail and the other end coupled to a predetermined portion of the other lower bone, the mutual cross members being coupled rotatably in centers thereof and being thus formed like X, and a support structure for supporting the seat frame in order to maintain a positional relationship between the main frame and the seat frame. Each of the upper bones is divided into a fore upper bone constituting the forward part of the upper bone and a hind upper bone constituting a rear part of the seat by an attachment of a seat member. The hind upper bone is coupled to the fore upper bone through a hinge structure in order to be freely inclined to the fore upper bone. The cross brace is disposed before the hinge structure.

In the body frame, when the hind upper bone is inclined downward through the hinge structure, the rear part of the seat sinks. The back frame is provided on the upper bone of the main frame. Therefore, the back is inclined rearward. In the body frame, when the rear part of the seat sinks, and furthermore, the back is inclined rearward.

In the body frame, the upper bones making a transverse pair, the lower bones making a transverse pair and the seat rails making a transverse pair are coupled to each other through the cross brace formed like X. When the cross angle of the cross members is changed, a distance in the transverse direction between the upper bones is changed. When the cross angle of the cross members is changed, a distance in the transverse direction between the lower bones is changed. When the cross angle of the cross members is changed, a distance in the transverse direction between the seat rails is changed. Accordingly, the body frame is folded in the transverse direction.

The seat frame is coupled to the main frame through the support structure. When the body frame is folded in the transverse direction, therefore, the positional relationship between the main frame and the seat frame is maintained. In such a body frame, the seat frame can be prevented from being freely displaced with respect to the main frame. Therefore, the body frame can easily be folded. The cross brace is provided before the hinge structure. Therefore, the reclining structure and the folding structure are constituted separately and independently. In the body frame, the reclining structure and the folding structure can be implemented with a simple structure.

In the body frame, the hinge structure includes a front block provided on a rear end of the fore upper bone, a back block provided on a front end of the hind upper bone, and a coupling pin for coupling both of them. An engagement shaft portion protruded along a rotating axis of the hind upper bone is formed on either the front block or the back block. An engagement dent is provided along the rotating axis on either the remaining front block or the remaining back block. The engagement shaft portion is fitted rotatably in the engagement dent in a direction of the rotating axis.

In the body frame, the hinge structure is formed by coupling a pair of front and back blocks to each other. Since the engagement shaft portion is fitted in the engagement dent, the stiffness of the hinge structure can be increased. The hind upper bone is rotated accurately without a twist with respect to the fore upper bone. In the case in which the rear part of the seat sinks and the back is inclined rearward, there is an advantage that the body frame is not twisted.

In the body frame, the front block and the back block are coupled to each other like a shiplap along the rotating axis. In the body frame, there is an advantage that the stiffness of the hinge structure is further increased.

In the body frame, the support structure includes a first coupling rod for coupling a middle part of one of the cross members to the main frame, and a second coupling rod for coupling a middle part of the other cross member to the main frame. Both ends of each of the coupling rods are rotatably coupled to each of the cross members and the main frame.

When the body frame is folded in the transverse direction, therefore, a pair of upper and lower bones approach each other and a pair of seat rails provided along the upper bones also approach each other. The cross member and the main frame are coupled to each other through the first coupling rod and another cross member and the main frame are coupled to each other through the second coupling rod. Therefore, the positional relationship between the seat frame coupled to each cross member and the main frame is maintained. In this case, the seat frame can be prevented from being freely displaced with respect to the main frame. Therefore, the body frame can easily be folded.

In the present invention, the rear part of the seat sinks, and furthermore, the back is inclined rearward. When the user of the wheelchair employing the body frame lies down, consequently, the back portion falls rearward, and at the same time, the hip portion sinks downward. Therefore, the hip portion of the user is not shifted with respect to the seat. The cross brace is disposed so that the body frame is folded. Thus, the wheelchair employing the body frame can be folded to be compact and can easily be loaded onto a car or the like.

DESCRIPTION OF THE PREFERRED EMBODIMENTS

The present invention will be described below in detail based on preferred embodiments with reference to the drawings.

First Embodiment (1) Summary and Feature of the Embodiment

Figure 1:
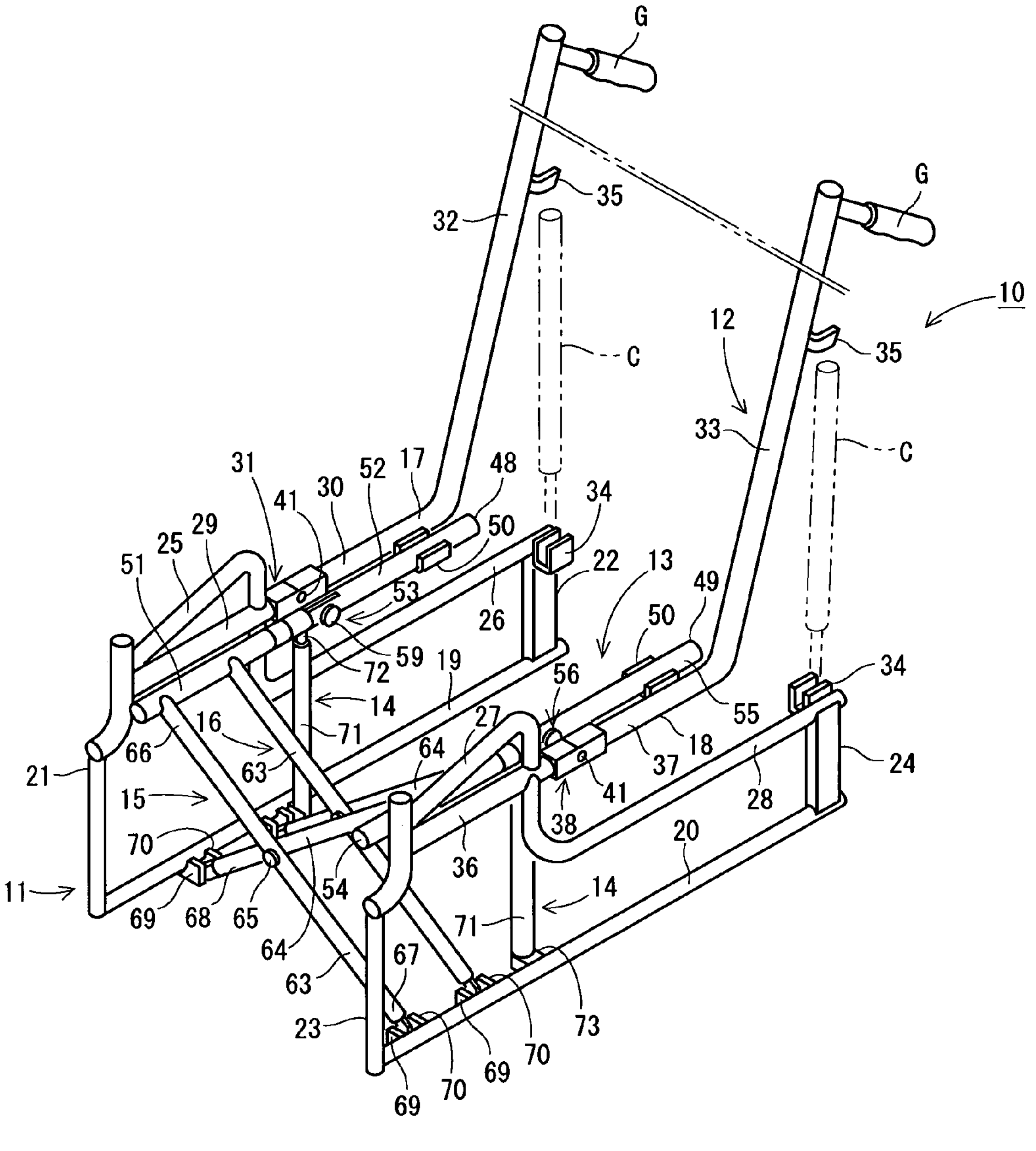
FIG. 1 is a perspective view showing a body frame for a wheelchair according to an embodiment of the present invention.

A body frame 10 for a wheelchair shown in FIG. 1 constitutes the frame of the wheelchair, and comprises a main frame 11, a back frame 12 formed integrally with the main frame 11, a seat frame 13 provided along the main frame 11, a support structure 14 for holding the seat frame 13, and cross braces 15 and 16.

The body frame 10 according to the present embodiment has a feature that the seat frame 13 is bent together with the main frame 11 in the middle part of the seat frame 13 and the back frame 12 is thus inclined rearward, and at the same time, only the rear part of the seat frame 13 sinks and that the body frame 10 can be folded in the transverse direction by means of the cross braces 15 and 16. The structure of the body frame 10 will be described below in detail.

(2) Construction of Main Frame

The main frame 11, the back frame 12 and the seat frame 13 are constituted by a rod member formed of a metal such as an aluminum alloy. The main frame 11 includes a pair of upper bones 17 and 18 (members for supporting a member to divide a seat), and a pair of lower bones 19 and 20. As shown in FIG. 1, the upper bones 17 and 18 are provided opposite to each other in a transverse direction. The upper bones 17 and 18 are extended in a longitudinal direction. The lower bones 19 and 20 are provided vertically downward from the upper bones 17 and 18, respectively. The lower bones 19 and 20 are provided in parallel with the upper bones 17 and 18. The lower bones 19 and 20 are extended in the longitudinal direction.

The upper bone 17 and the lower bone 19 are coupled to each other through connectors 21 and 22. The connector 21 is constituted by a pipe member formed of a metal such as an aluminum alloy. In the present embodiment, the connector 21 positioned before the body frame 10 is coupled to the upper bone 17 in an upper part thereof. A caster constituting the front wheel of the wheelchair is attached to the connector 21. The connector 22 positioned in the rearward part of the body frame 10 is formed by a rectangular plate member. The connector 22 is constituted by a plate member formed of a metal such as an aluminum alloy. The rear wheel of the wheelchair is attached to the connector 22. The thickness of the connector 22 is set to have a predetermined value in order to maintain a necessary strength. Connectors 23 and 24 couple the upper bone 18 to the lower bone 20. Since the connectors 23 and 24 have the same structures as the connectors 21 and 22, description thereof will be omitted.

In the present embodiment, reinforcements 25 to 28 are provided in order to maintain a high stiffness of the main frame 11. The reinforcements 25 to 28 are constituted by pipes formed of a metal such as an aluminum alloy. The reinforcements 25 to 28 are almost L-shaped. The reinforcement 25 couples the upper end of the connector 21 to the middle part of the upper bone 17. The reinforcement 26 couples the middle part of the upper bone 17 to the upper end of the reinforcement 22. The reinforcement 27 couples the upper end of the connector 23 to the middle part of the upper bone 18. The reinforcement 28 couples the middle part of the upper bone 18 to the upper end of the reinforcement 24. The rear ends of the reinforcements 26 and 28 are provided with a bracket 34 for supporting an extension cylinder C which will be described below.

(3) Back Frame

The back frame 12 includes a pair of back rails 32 and 33 (members for dividing the back). As shown in FIG. 1, the back rails 32 and 33 are extended rearward from the upper bones 17 and 18. In the present embodiment, the back rails 32 and 33 constituting the back frame 12 are formed integrally with the upper bones 17 and 18 constituting the main frame 11. The back rails 32 and 33 formed separately from the main frame 11 may be coupled to the upper bones 17 and 18, thereby forming the back frame 12. In the present embodiment, a grip G is provided in the upper part of each of the back rails 32 and 33. The grip G is gripped by a carer for caring for the user of the wheelchair if any.

The back rails 32 and 33 are extended obliquely and upward. The back rails 32 and 33 are provided in parallel with each other in a transverse direction. A seat member is attached to these back rails 32 and 33 so that the back of the wheelchair is constituted. Each of the back rails 32 and 33 is provided with a bracket 35 for supporting the extension cylinder C. A gas cylinder is illustrated as the extension cylinder C. Both ends of the extension cylinder C are coupled to the brackets 35 and 34 so that the extension cylinder C is disposed between the main frame 11 and the back frame 12.

(4) First Hinge Structure

The upper bone 17 constituting the main frame 11 is divided into a fore upper bone 29 and a hind upper bone 30. The hind upper bone 30 is coupled to the fore upper bone 29 through a hinge structure 31 (a first hinge structure) so as to be inclined with respect to the fore upper bone 29. The upper bone 18 is divided into a fore upper bone 36 and a hind upper bone 37. The hind upper bone 37 is coupled to the fore upper bone 36 through a hinge structure 38 (a first hinge structure) so as to be freely inclined to the fore upper bone 36. The reinforcements 25 and 27 are coupled to the upper surface sides of the upper bones 29 and 36.

When the hind upper bones 30 and 37 are inclined to the fore upper bones 29 and 36, the rear part of the main frame 11 (the hind upper bones 30 and 37) is inclined rearward and downward (sinks). In addition, the back frame 12 falls rearward. The back frame 12 is coupled and supported onto the main frame 11 through the extension cylinder C. When the back frame 12 falls rearward, therefore, the extension cylinder C is contracted and shortened. When the back frame 12 is erected forward, the extension cylinder C is extended.

The hinge structure 31 has the same construction as the hinge structure 38. In the following, only the construction of the hinge structure 38 will be described and the explanation of the hinge structure 31 will be omitted.

Figure 2:
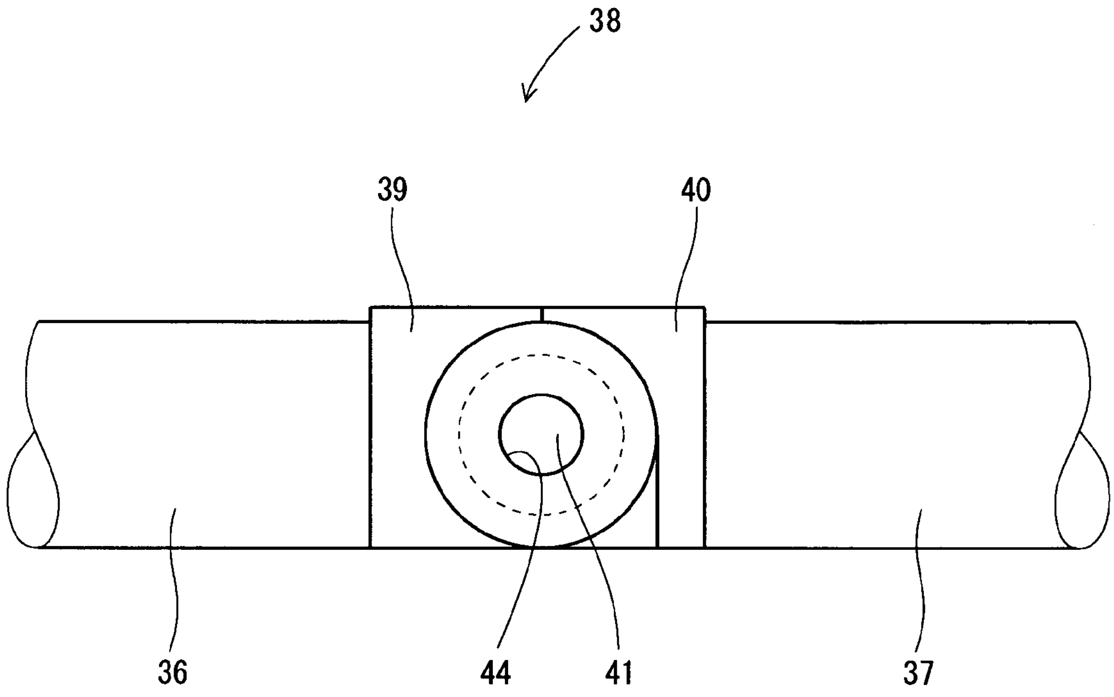
FIG. 2 is an enlarged front view showing a hinge structure to be employed in the body frame for a wheelchair according to the embodiment of the present invention.
Figure 3:
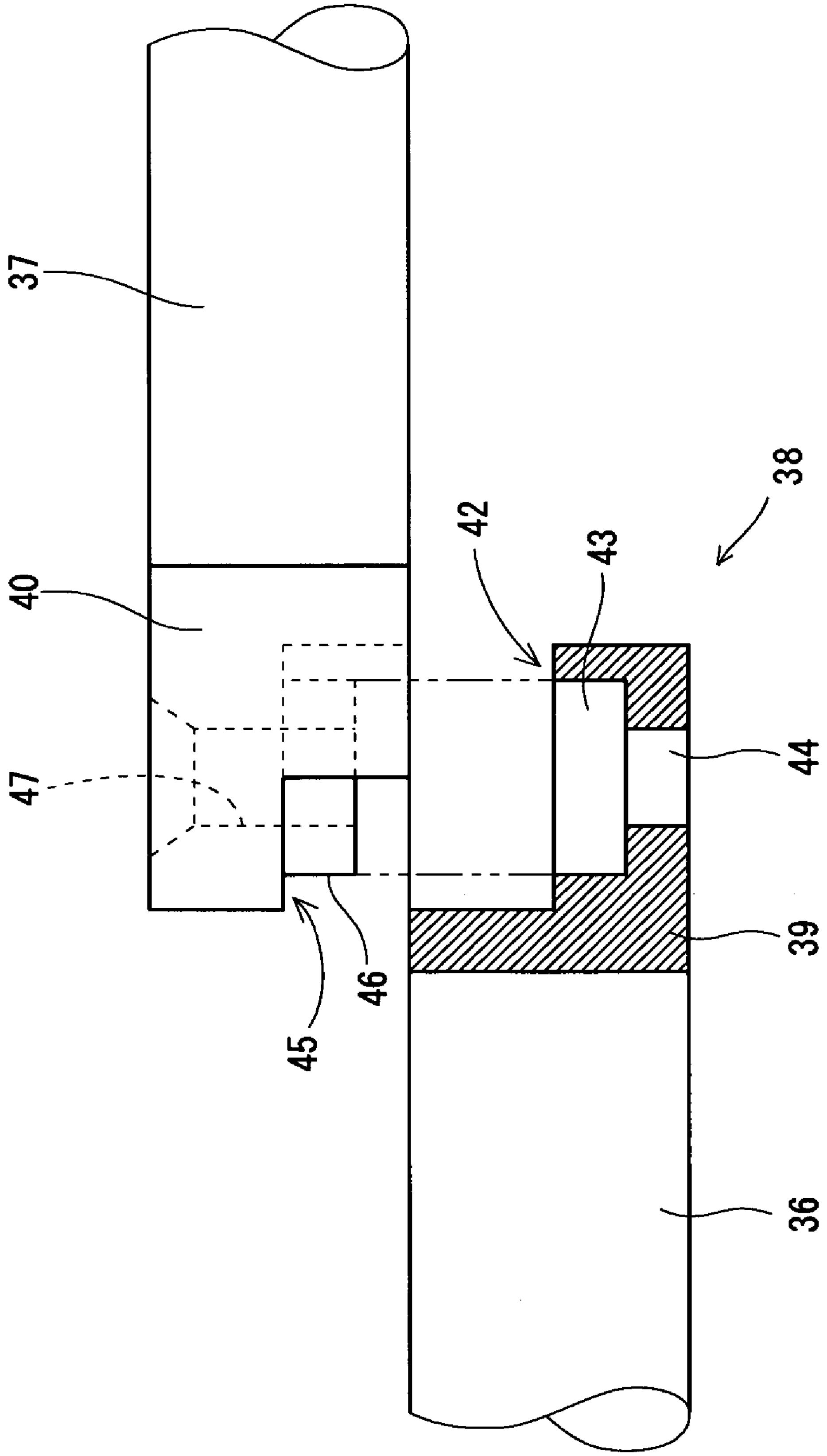
FIG. 3 is a partially sectional exploded and enlarged plan view showing the hinge structure to be employed in the body frame for a wheelchair according to the embodiment of the present invention.
Figure 4:
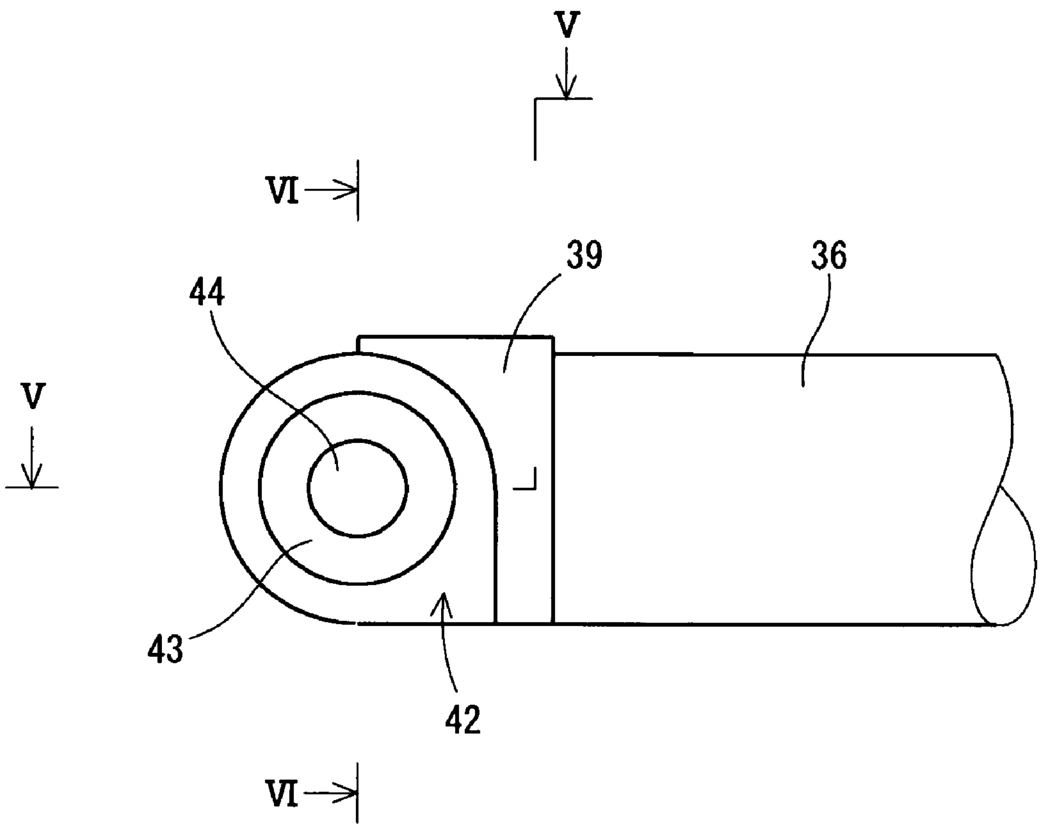
FIG. 4 is an enlarged front view showing the main part of the hind upper bone of the body frame for a wheelchair according to the embodiment of the present invention.
Figure 5:
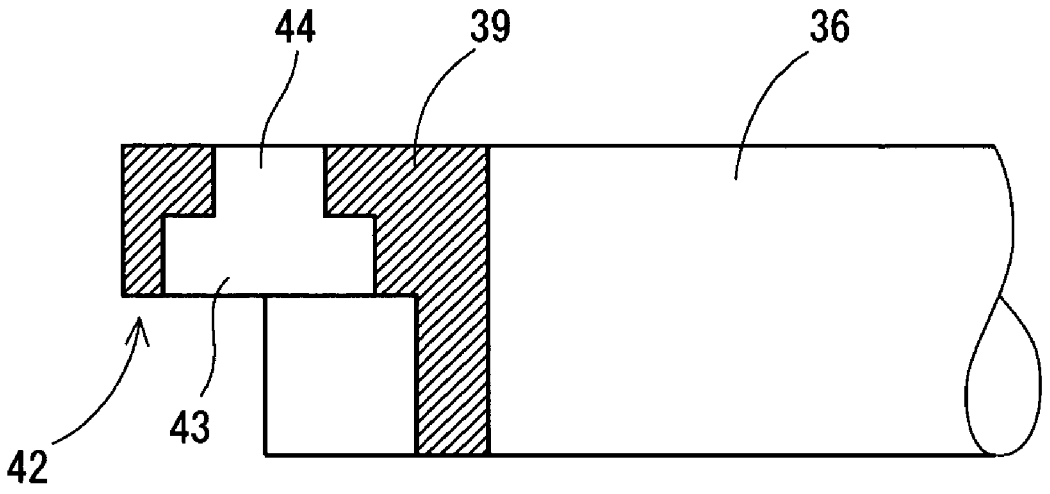
FIG. 5 is a sectional view taken along V-V in FIG. 4.
Figure 6:
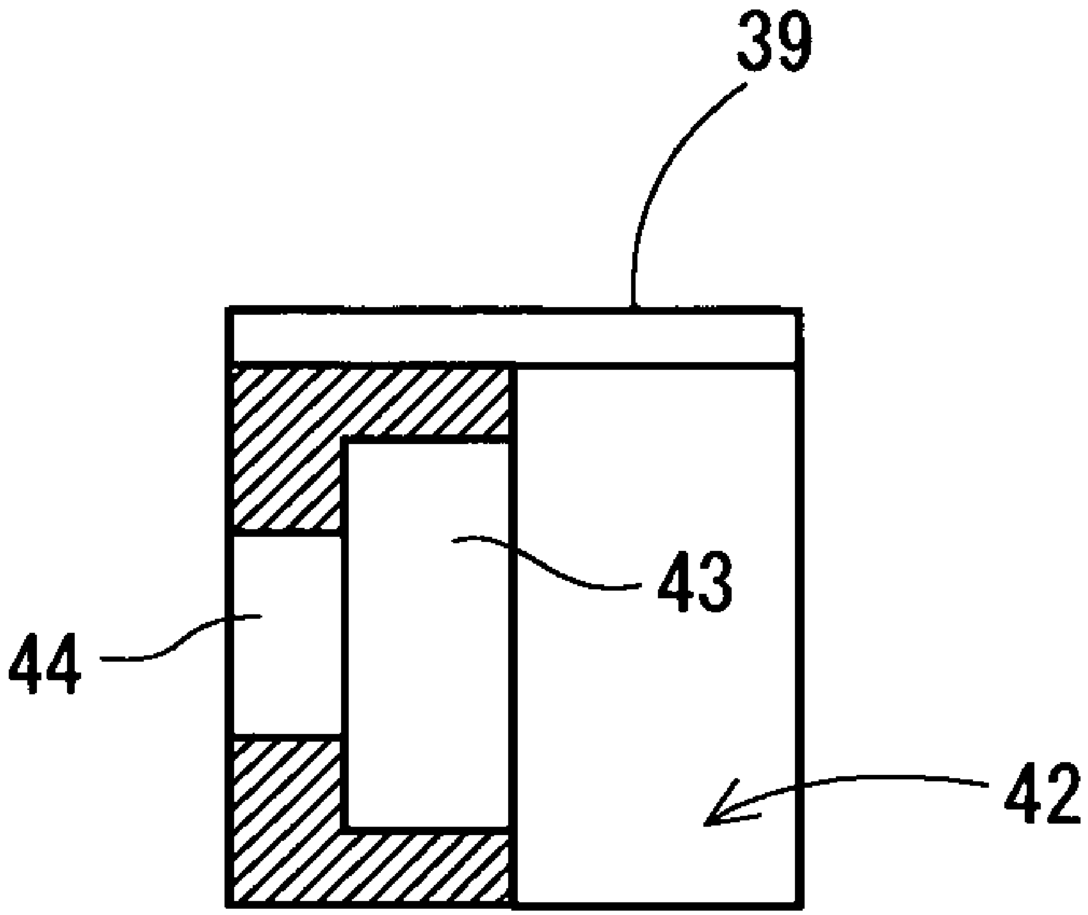
FIG. 6 is a sectional view taken along VI-VI in FIG. 4.
Figure 7:
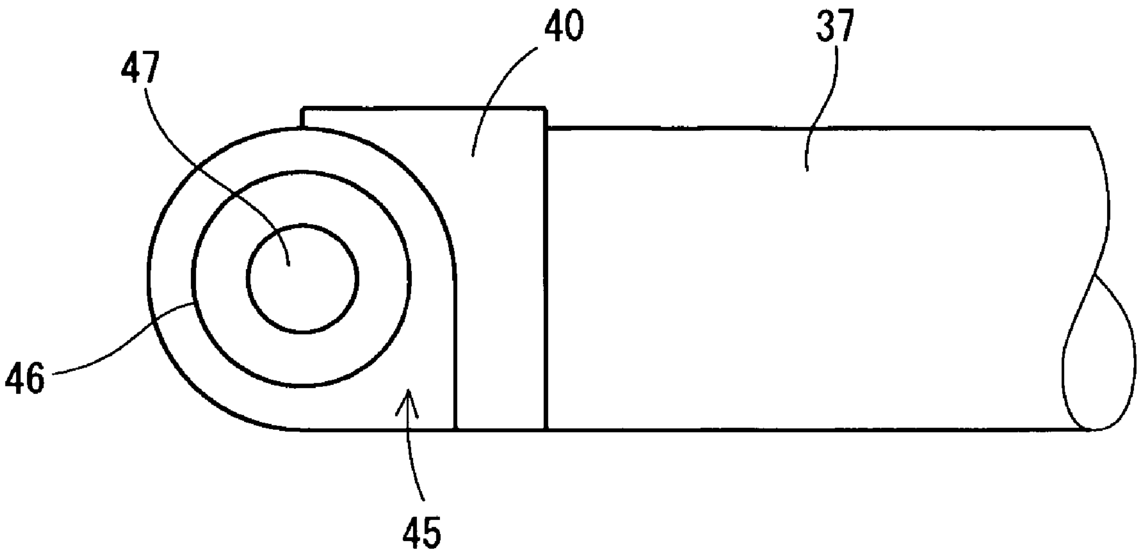
FIG. 7 is an enlarged front view showing the main part of the hind upper bone of a body frame for a wheelchair according to a first embodiment of the present invention.
Figure 8:
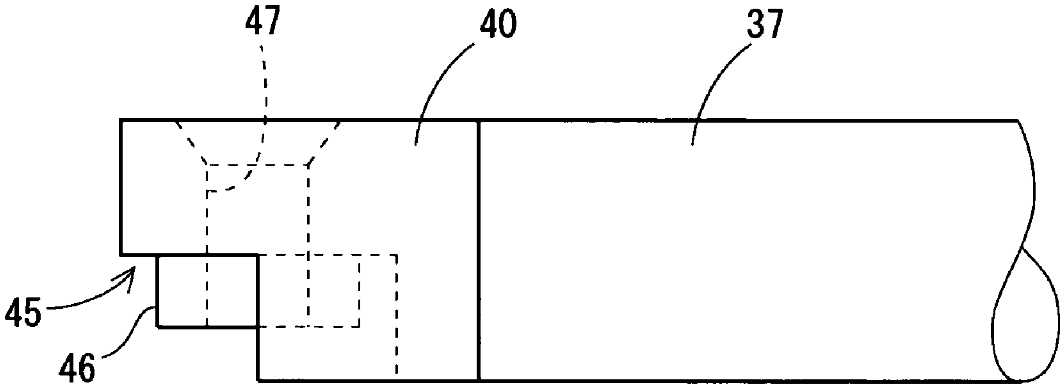
FIG. 8 is an enlarged plan view showing the main part of the hind upper bone of the body frame for a wheelchair according to the first embodiment of the present invention.
Figure 9:
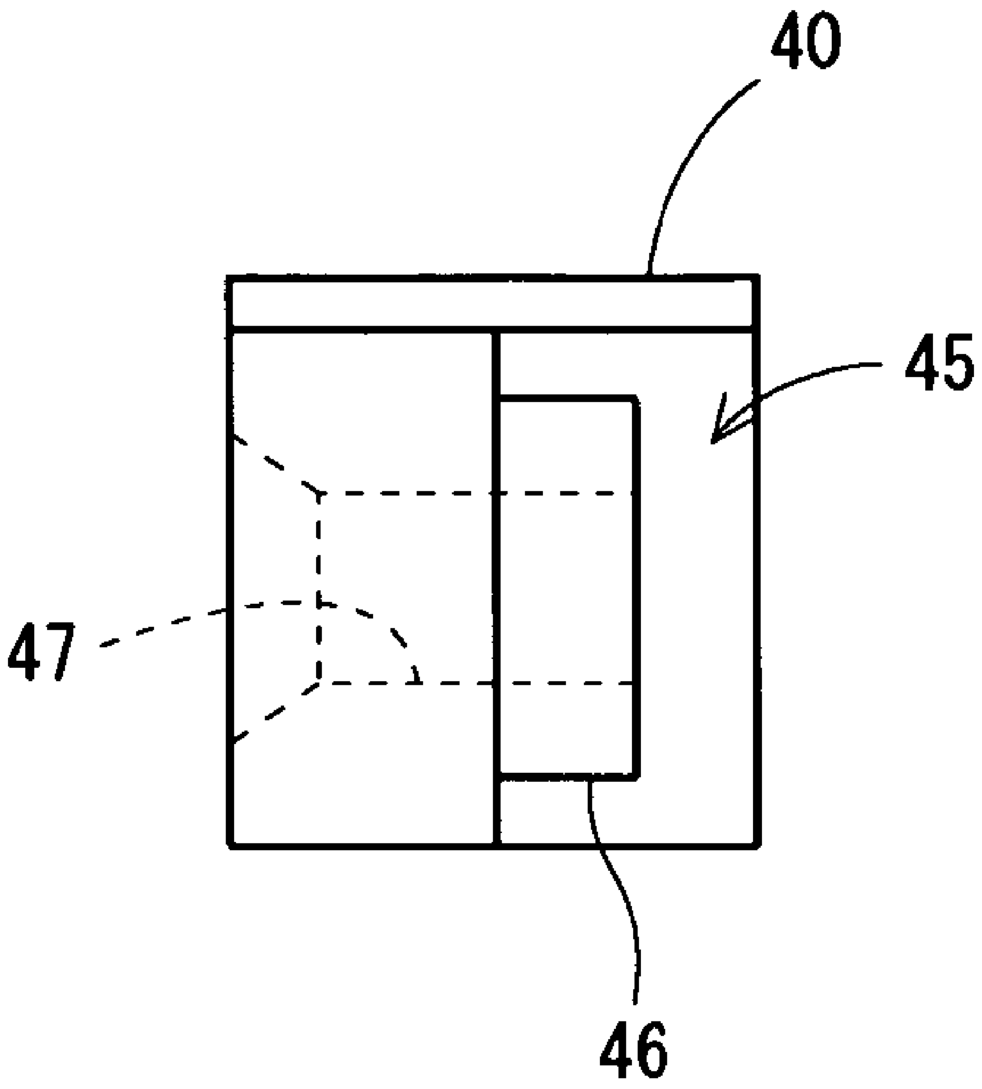
FIG. 9 is an enlarged side view showing the main part of the hind upper bone of the body frame for a wheelchair according to the first embodiment of the present invention.

As shown in FIGS. 2 and 3 (reference will be properly made to FIGS. 4 to 9), the hinge structure 38 includes a front block 39, a back block 40 and a coupling pin 41. In FIG. 3, the coupling pin 41 is not shown. The front block 39 is attached to the rear end of the fore upper bone 36. The back block 40 is attached to the front end of the hind upper bone 37.

The front block 39 takes the shape of a block. A stair 42 (groove portion) is provided on the front block 39. The stair 42 is provided with a dent 43 (an engagement dent). The dent 43 takes a circular shape. The inside diameter of the dent 43 is set to have a constant dimension with high precision. As shown in FIG. 3, a pierced hole 44 penetrating in a vertical direction is provided on the center of the dent 43. The coupling pin 41 is inserted through the pierced hole 44.

The back block 40 takes the shape of a block in the same manner as the front block 39. A stair 45 (a groove portion) is formed on the back block 40. A shaft portion 46 (an engagement shaft portion) is formed on the stair 45. The shaft portion 46 takes a cylindrical shape. The outside diameter of the shaft portion 46 corresponds to the inside diameter of the dent 43 and is set to have a constant dimension with high precision. The shaft portion 46 is fitted in the dent 43. The shaft portion 46 is rotated stably without shaking with respect to the dent 43. As shown in FIG. 3, a pierced hole 47 penetrating in a vertical direction is provided on the center of the shaft portion 46. The coupling pin 41 is inserted through the pierced hole 47.

As shown in FIG. 3, the front block 39 and the back block 40 are fitted in a vertical direction. The stairs 42 and 45 are formed on the front block 39 and the back block 40. Therefore, the front block 39 and the back block 40 are fitted in a shiplap state. The shaft portion 46 of the back block 40 is fitted in the dent 43 of the front block 39. When the coupling pin 41 is inserted through the pierced holes 44 and 47 in this state, the front block 39 and the back block 40 are reliably coupled to each other in a rotatable state. In the present embodiment, the pierced hole 47 is subjected to spot facing in such a manner that the coupling pin 41 can easily be inserted through the pierced holes 44 and 47.

(5) Seat Frame

As shown in FIG. 1, the seat frame 13 includes a pair of seat rails 48 and 49 (members for dividing the seat). The seat rails 48 and 49 are extended in a longitudinal direction along the upper bones 17 and 18, respectively. A seat member is attached to these seat rails 48 and 49 so that the seat of the wheelchair is constituted. In the present embodiment, the seat rails 48 and 49 are supported on receiving tools 50, and at the same time, are disposed on the side of the upper bones 17 and 18.

The receiving tool 50 is constituted by a rubber, a resin or the like in addition to a metal such as an aluminum alloy. In the present embodiment, the receiving tool 50 is almost U-shaped. The receiving tool 50 is attached to the upper bones 17 and 18. The seat rails 48 and 49 supported by the receiving tool 50 do not come in contact with the upper bones 17 and 18. A large number of receiving tools 50 may be provided in a longitudinal direction.

(6) Second Hinge Structure

The seat rail 48 constituting the seat frame 13 is divided into a fore seat rail 51 and a hind seat rail 52. The hind seat rail 52 is coupled to the fore seat rail 51 through a hinge structure 53 (a second hinge structure) so as to be freely inclined to the fore seat rail 51. The seat rail 49 is also divided into a fore seat rail 54 and a hind seat rail 55. The hind seat rail 55 is coupled to the fore seat rail 54 through a hinge structure 56 (a second hinge structure) so as to be freely inclined to the fore seat rail 54. As described above, when the hind upper bones 30 and 37 constituting the main frame 11 are inclined to the fore upper bones 29 and 36, the hind seat rails 52 and 55 constituting the seat frame 13 together with the hind upper bones 30 and 37 are inclined to the fore seat rails 51 and 54.

Figure 10:
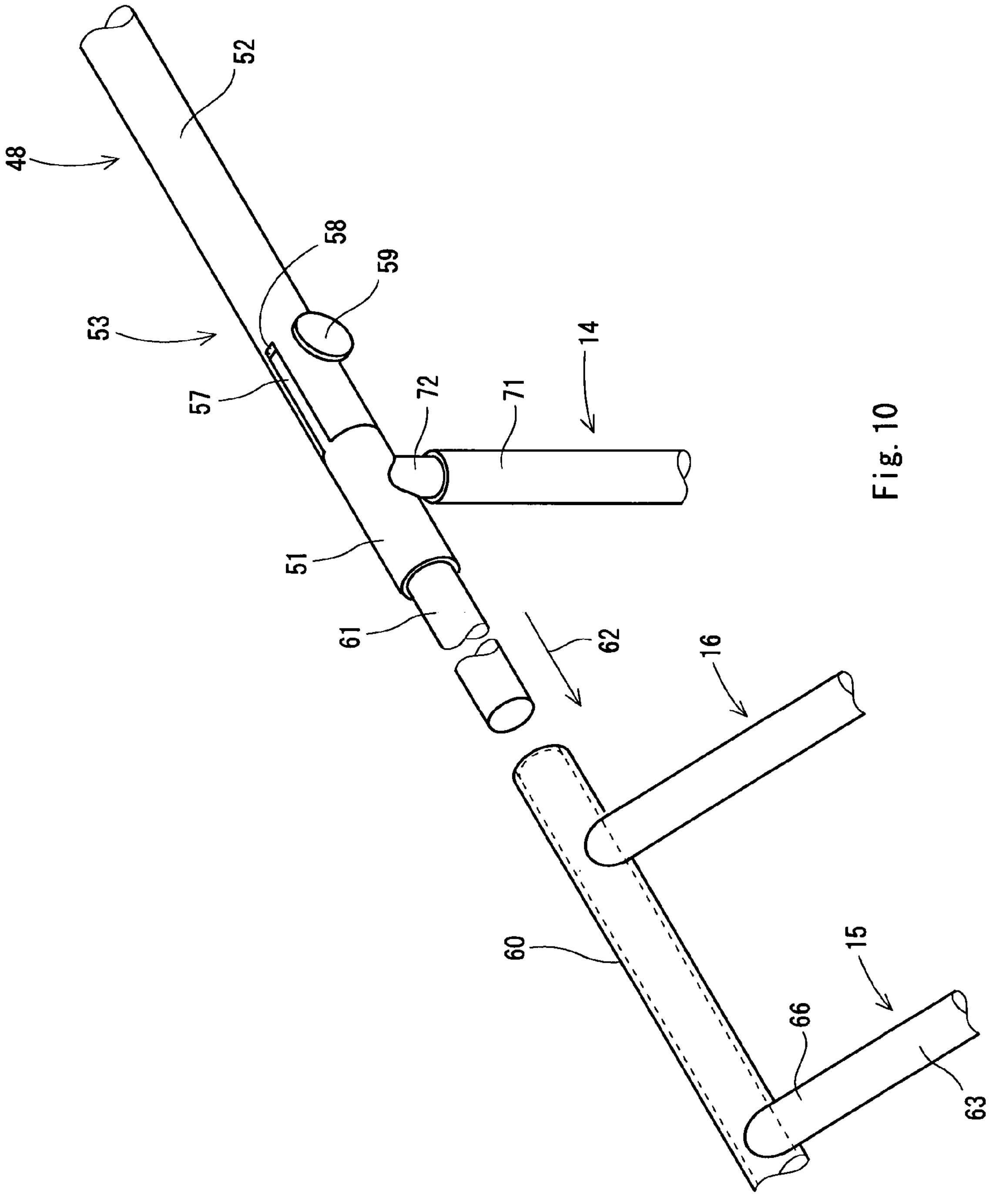
FIG. 10 is an enlarged and exploded perspective view showing the main part of the seat rail of the body frame for a wheelchair according to the first embodiment of the present invention.

FIG. 10 shows the construction of the hinge structure 53. The hinge structure 56 has the same construction as the hinge structure 53. In the following, only the construction of the hinge structure 53 will be described and the explanation of the hinge structure 56 will be omitted.

The hinge structure 53 includes an almost rectangular connecting plate 57 protruded from the rear end of the fore seat rail 51, a groove 58 provided in the axial direction on the tip of the hind seat rail 52, and a coupling pin 59. The coupling pin 59 is inserted with the connecting plate 57 fitted in the groove 58. The hind seat rail 52 is inclined to the fore seat rail 51 with the coupling pin 59 to be the center of a rotation. A clevis connector is constituted by the connecting plate 57 and the groove 58. The coupling pin 59 constitutes a clevis pin.

In the present embodiment, as shown in FIG. 1, the center of the coupling pin 59 (a virtual rotating axis) is coincident with that of the coupling pin 41 (a virtual rotating axis). For this reason, the rotating axis of the hind upper bone 30 in the first hinge structure 31 is coincident with that of the hind seat rail 52 in the hinge structure 53. The rotating axis of the hind upper bone 37 in the first hinge structure 38 is coincident with that of the hind seat rail 55 in the hinge structure 56.

In the present embodiment, as shown in FIG. 10, the fore seat rail 51 is divided into a front part and a rear part. More specifically, the front part of the fore seat rail 51 is constituted by an inserting pipe 60, and an inserted rod 61 is formed in the rear part of the fore seat rail 51. The inserted rod 61 is fitted in the inserting pipe 60.

The cross braces 15 and 16 which will be described below in detail are coupled to the inserting pipe 60. The inserted rod 61 is formed integrally with the tip side of the rear part of the fore seat rail 51. More specifically, the inserted rod 61 is formed by reducing the outside diameter of the rear part of the fore seat rail 51. The inside diameter of the inserting pipe 60 corresponds to the outside diameter of the inserted rod 61. In the direction of an arrow 62 in FIG. 10, the inserted rod 61 is inserted in the inserting pipe 60. Therefore, the inserting pipe 60 is supported on the inserted rod 61 without causing a looseness. The inserting pipe 60 is rotated around the axis of the inserted rod 61. Since the fore seat rail 54 also has the same structure as the fore seat rail 51, description thereof will be omitted.

(7) Cross Brace

As shown in FIG. 1, the cross braces 15 and 16 are coupled to the seat rails 48 and 49 constituting the seat frame 13. The cross brace 15 includes a pair of cross members 63 and 64. In the present embodiment, the cross brace 15 and the cross brace 16 have the same structure. The cross brace 16 is provided in parallel with the cross brace 15 behind the cross brace 15. The cross braces 15 and 16 are provided before the seat frame 13 and the main frame 11. More specifically, the cross braces 15 and 16 are provided before both the hinge structures 31 and 38 and the hinge structures 53 and 56. In the present embodiment, two pairs of cross braces 15 and 16 are provided. The body frame 10 may be provided with a large number of cross braces or only one cross brace.

In the present embodiment, each of the cross members 63 and 64 is a round pipe formed of a metal such as an aluminum alloy. Each of the cross members 63 and 64 may be constituted by a square pipe, a solid natural wood or the like. The cross members 63 and 64 are formed by members having the same construction and are disposed like X. The cross members 63 and 64 are coupled through a rotating central axis 65. Consequently, the cross members 63 and 64 are rotated around the rotating central axis 65. The rotating central axis 65 is prevented from slipping off through a snap ring (a retainer) or the like.

An end 66 of the cross member 63 (one of the cross members) is coupled to the inserting pipe 60 (see FIG. 10) of the seat rail 48 (one of the seat rails). The other end 67 of the cross member 63 is coupled to the lower bone 20 (the other lower bone) An end (which is not shown in FIG. 1) of the cross member 64 (the other cross member) is coupled to an inserting pipe (which is not shown in FIG. 1) of the seat rail 49 (the other seat rail). The other end 68 of the cross member 64 is coupled to the lower bone 19 (one of the lower bones). The cross member 64 is coupled to the seat rails 48 and 49 and the lower bones 19 and 20. The end 66 of the cross member 63 is fixed to the seat rail 48 (more specifically, the inserting pipe 60) through welding. The cross member 64 is also fixed to the seat rail 48 in the same manner as the cross member 63.

The other end 67 of the cross member 63 is coupled to the lower bone 20 through a support pin which is not shown. More specifically, the lower bone 20 is provided with a pair of support plates 69 and 70, respectively. A support pin is inserted through the other end 67 of the cross member 63. Both ends of the support pin are supported on the support plates 69 and 70. Consequently, the other end 67 of the cross member 63 can be rotated with the support pin set to be an axis. The other end 68 of the cross member 64 is also fixed to the lower bone 19 in the same manner as the cross member 63.

(8) Support Structure

As described above, the seat frame 12 is supported on the main frame 11 through the support structure 14 shown in FIGS. 1 and 10. The support structure 14 includes a coupling pipe 71 and a coupling rod 72. The support structure 14 is provided on the lower bones 19 and 20. The support structure 14 disposed on the side of the lower bone 19 and the support structure 14 disposed on the side of the lower bone 20 have the same structure. For this reason, only the support structure 14 disposed on the side of the lower bone 19 will be described below.

The materials of the coupling pipe 71 and the coupling rod 72 which constitute the support structure 14 are metals such as an aluminum alloy. The lower end of the coupling pipe 71 is fixed to the lower bone 19 constituting the main frame 11. In the present embodiment, the coupling pipe 71 is coupled to the lower bone 19 through a bracket 73. The upper end of the coupling pipe 71 may be coupled to the upper bone 17 through a predetermined bracket or the like.

The coupling rod 72 is formed integrally with the seat rail 48. More specifically, the coupling rod 72 is provided behind the fore seat rail 51 (in the vicinity of the hinge structure 53). The coupling rod 72 is extended downward orthogonally to the fore seat rail 51. The upper end of the coupling rod 72 is coupled to the fore seat rail 51, and furthermore, the coupling rod 72 is inserted through the inside of the coupling pipe 71 from a lower end side thereof. The outside diameter of the coupling rod 72 corresponds to the inside diameter of the coupling pipe 71. The coupling rod 72 is perfectly accommodated in the coupling pipe 71 without causing a looseness. The coupling rod 72 slides in an axial direction (a vertical direction) thereof.

In the body frame 10 for a wheelchair according to the present embodiment, as described above, a caster is attached to the connectors 21 and 23. Rear wheels are attached to the connectors 22 and 24. A seat member is attached to the back frame 12 and the seat frame 13. Thus, a wheelchair having a back and a seat is constituted. According to the body frame 10, the wheelchair can carry out the following operation.

(9) Function of Body Frame 10 for Wheelchair

Figure 11:
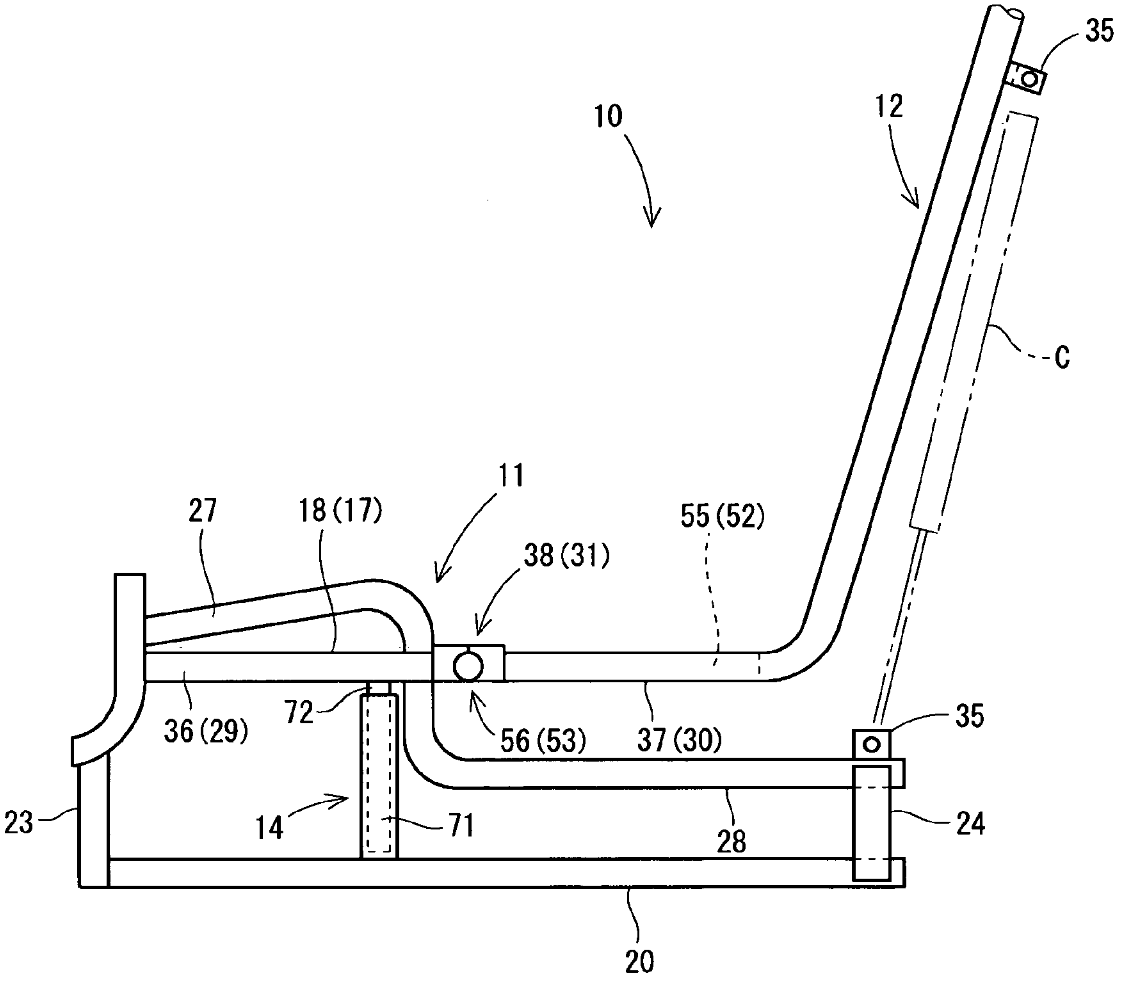
FIG. 11 is a side view showing the body frame for a wheelchair according to the first embodiment of the present invention.
Figure 12:
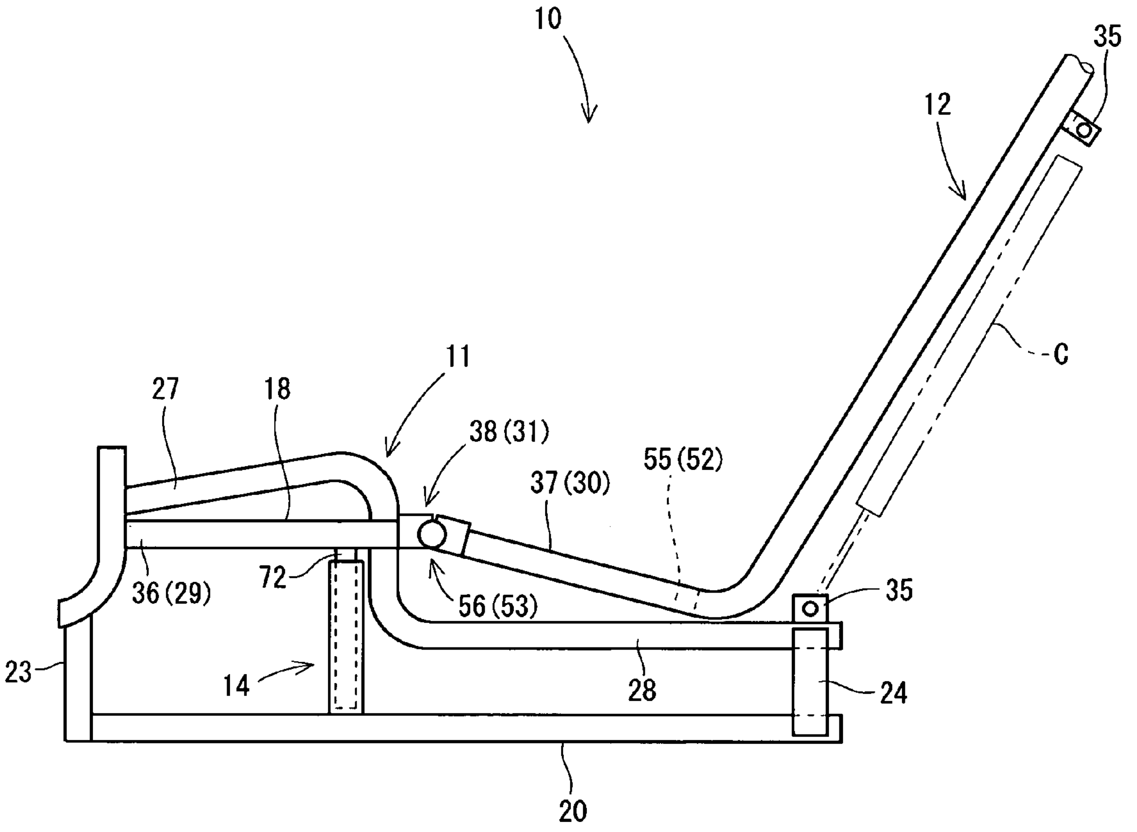
FIG. 12 is a side view showing the body frame for a wheelchair according to the first embodiment of the present invention.

With reference to FIGS. 11 and 12, description will be given to the reclining structure of the body frame 10 for the wheelchair.

As shown in FIG. 11, the back frame 12 is provided integrally with the upper bones 17 and 18 of the main frame 11. The hind upper bones 30 and 37 are coupled to the fore upper bones 29 and 36 through the hinge structures 31 and 38. As shown in FIG. 12, when the hind upper bones 30 and 37 fall downward through the hinge structures 31 and 38, the back frame 12 (back) is also inclined rearward. Referring to the seat frame 13, the hind seat rails 52 and 55 fall downward through the hinge structures 53 and 56. Therefore, the rear part of the seat sinks. In the body frame 10, only the rear part of the seat sinks, and furthermore, the back of the seat is inclined rearward.

Figure 13:
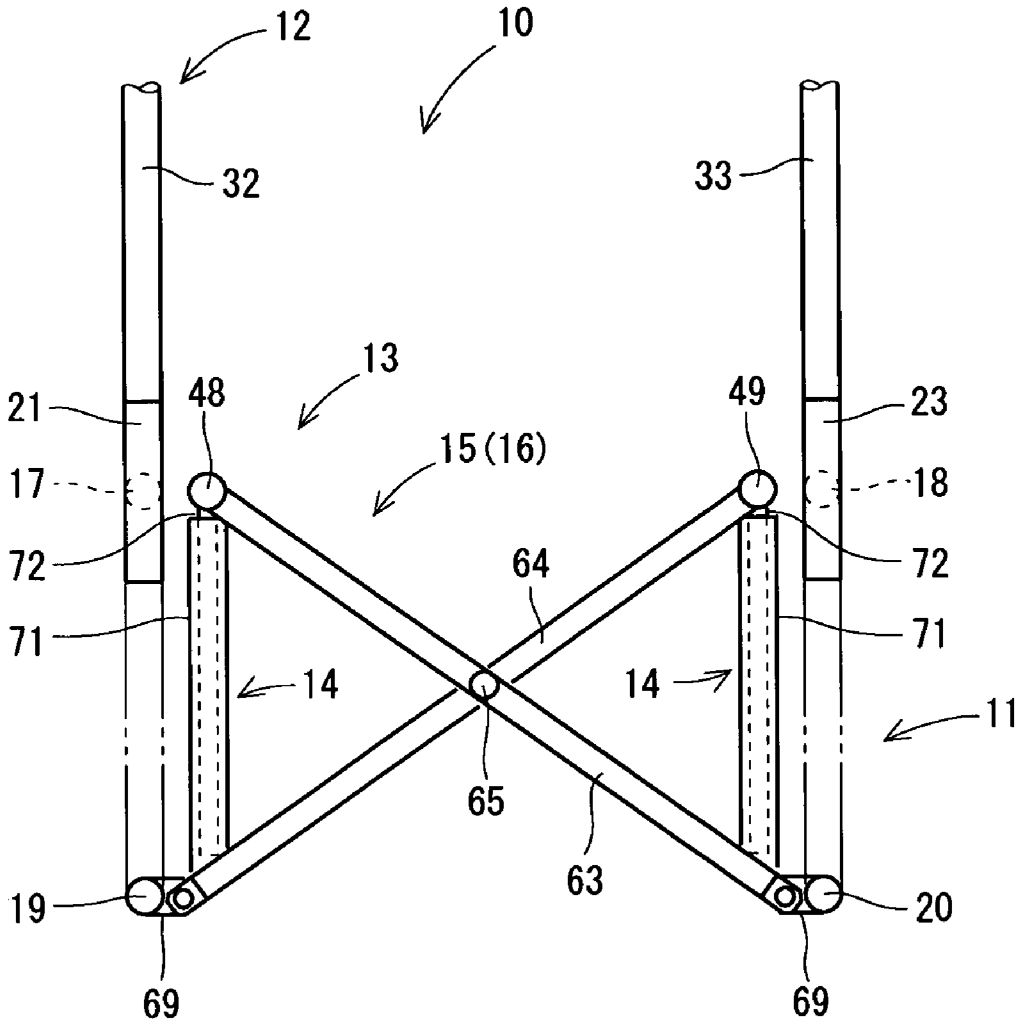
FIG. 13 is a front view showing the body frame for a wheelchair according to the first embodiment of the present invention.
Figure 14:
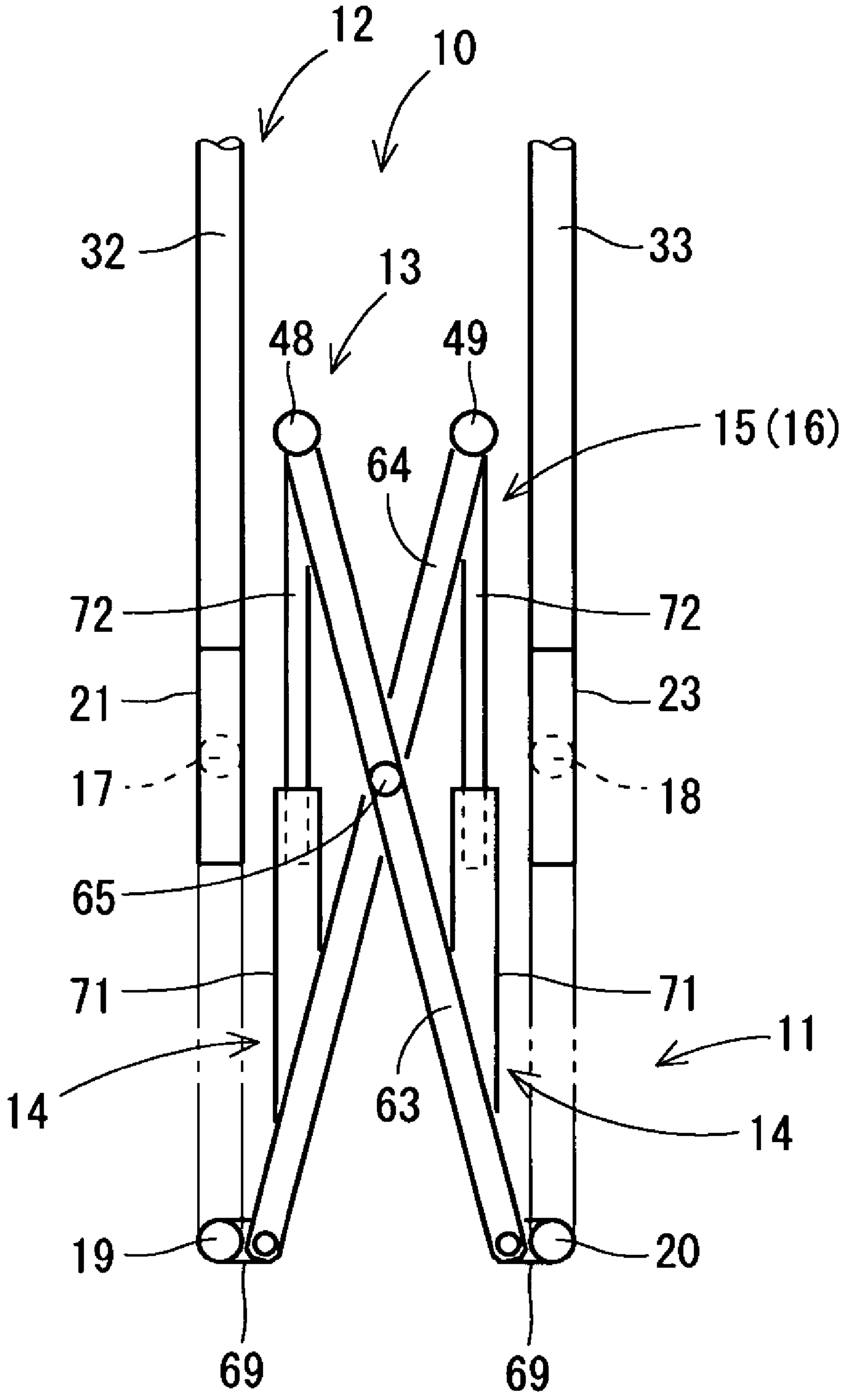
FIG. 14 is a front view showing the body frame for a wheelchair according to the first embodiment of the present invention.

With reference to FIGS. 13 and 14, description will be given to an operation for folding the body frame 10.

As shown in FIG. 13, the seat frame 13 is coupled to the main frame 11 through the support structure 14. As described above, the seat frame 13 is coupled to the main frame 11 through the cross braces 15 and 16. As shown in FIG. 14, when the cross angle of the cross members 63 and 64 constituting the cross braces 15 and 16 is changed, distances in a transverse direction between the upper bones 17 and 18, the lower bones 19 and 20, and the seat rails 48 and 49 which are positioned on left and right are varied. In the body frame 10, when the cross angel of the cross members 63 and 64 is changed, the body frame 10 is folded in the transverse direction.

The seat frame 13 can hold a positional relationship with the main frame 11 by the support structure 14, and furthermore, can slide in a vertical direction. The operation for folding the body frame 10 can be carried out smoothly. The cross braces 15 and 16 are disposed before the hinge structures 31, 38, 53 and 56 (see FIG. 1). Therefore, the structure (reclining structure) for causing the user of the wheelchair to lie down and the structure (folding structure) for implementing the fold of the wheelchair are constituted separately and independently. The reclining structure and the folding structure can be constituted easily and inexpensively, respectively. Such a body frame 10 has an advantage that a manufacturing cost thereof can be reduced.

In the body frame 10 for the wheelchair according to the present embodiment, the back is inclined rearward while the rear part of the seat sinks downward. Therefore, the user of the wheelchair can lie down without losing a posture. Since the cross braces 15 and 16 are disposed, the wheelchair can be folded. Since the wheelchair is folded to be compact, it can easily be loaded on a car or the like.

In particular, the body frame 10 for the wheelchair according to the present embodiment has the following functions and effects.

The hinge structures 31 and 38 for implementing the bend of the hind upper bones 17 and 18 are constituted by coupling a pair of front and back blocks 39 and 40. The shaft portion 46 provided on both of them is fitted in the dent 43. Therefore, these hinge structures 31 and 38 have a high stiffness. The hind upper bones 17 and 18 are accurately rotated around the coupling pin 41 without a twist with respect to the fore upper bones 29 and 36. The rear part of the seat sinks, and furthermore, the back is inclined rearward. Therefore, the body frame 10 is not twisted. The user of the wheelchair can lie down without any anxiety.

The blocks 39 and 40 are coupled to each other like a shiplap along the rotating axis of the coupling pin 41. Therefore, the body frame 10 has an advantage that the stiffnesses of the hinge structures 31 and 38 are further increased. The rotating axes of the hinge structures 31 and 38 are coincident with those of the hinge structures 53 and 56, respectively. Therefore, a position in which the rear part of the seat is bent is coincident with a position in which the main frame 11 is bent. When lying down, the user of the wheelchair can be prevented from feeling uncomfortable.

The support structure 14 according to the present embodiment is constituted in such a manner that the coupling rod 72 can be inserted through the coupling pipe 71. The body frame 10 has an advantage that a positional relationship between the main frame 11 and the seat frame 13 is held easily and reliably and the support structure 14 is constituted inexpensively.

The fore seat rails 51 and 54 having the cross braces 15 and 16 coupled thereto are constituted in such a manner that the inserted rod 61 can be inserted through the inserting pipe 60. The inserting pipe 60 can be rotated around the inserted rod 61. When the cross angle of the cross members 63 and 64 is changed, the seat rails 48 and 49 are rotated in order to offset the change in the cross angle of the cross members 63 and 64. Such a body frame 10 has an advantage that a seat member can be prevented from being strongly pulled or loosened also in the case in which the seat member is fixed to the seat rails 48 and 49.

Second Embodiment

Next, description will be given to a second embodiment according to the present invention.

Figure 15:
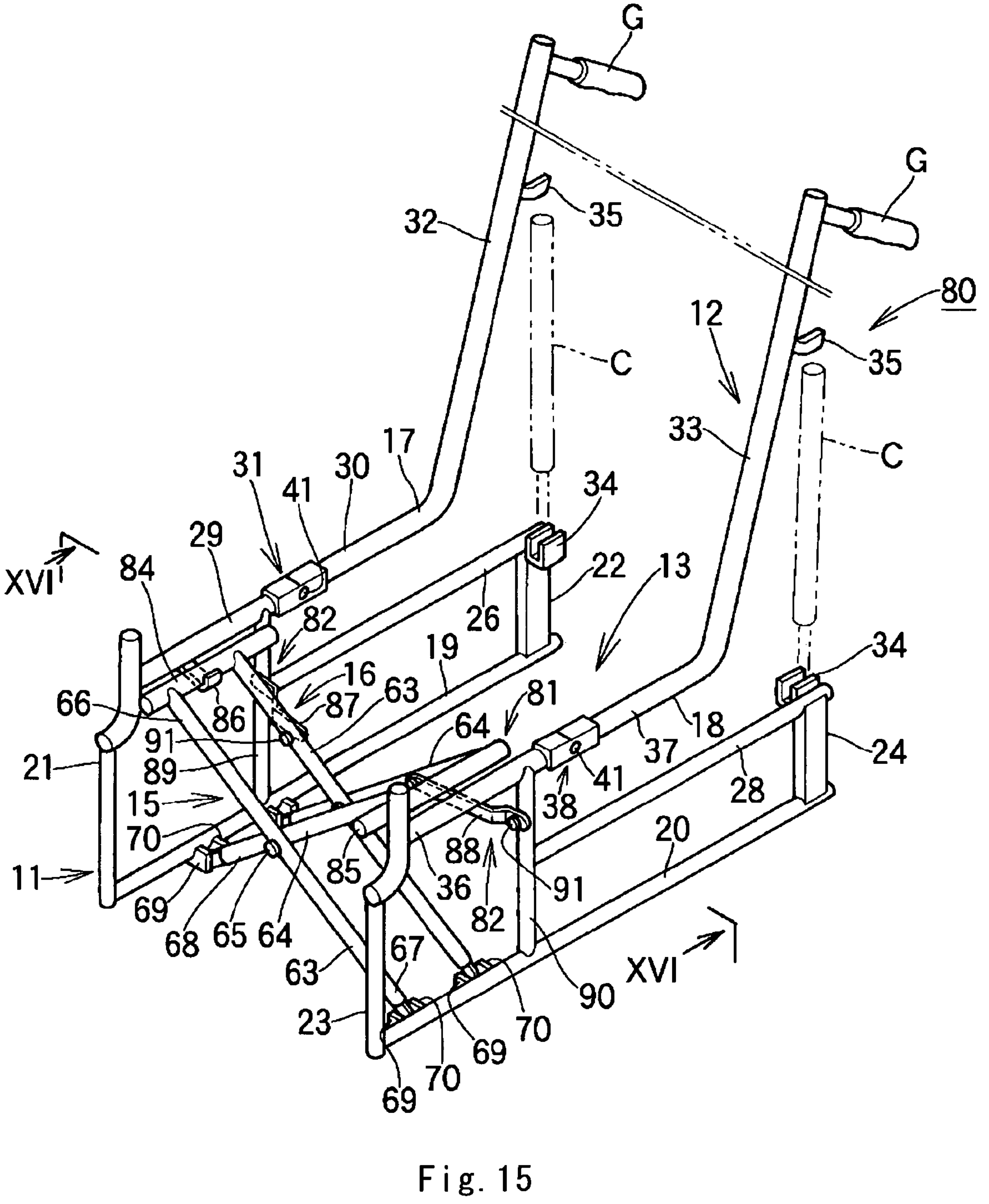
FIG. 15 is a perspective view showing a body frame for a wheelchair according to a second embodiment of the present invention.

A body frame 80 for a wheelchair shown in FIG. 15 also constitutes the frame of a wheelchair in the same manner as the body frame 10 for a wheelchair according to the first embodiment. The body frame 80 comprises a main frame 11, a back frame 12 formed integrally with the main frame 11, a seat frame 81 disposed along the main frame 11, a support structure 82 for holding the seat frame 81, and cross braces 15 and 16.

The body frame 80 for a wheel chair according to the present embodiment is different from the body frame 10 for a wheelchair according to the first embodiment in that:

(a) the seat frame 13 can be bent in the middle part thereof in the first embodiment, while the seat frame 81 (a member for dividing a seat) does not have a bending construction but is disposed along the forward part of the main frame 11 in the body frame 80 for a wheelchair according to the present embodiment;

(b) the seat is constituted by the seat frame 13 in the first embodiment, while the seat frame 81 constitutes the forward part of the seat and the main frame 11 constitutes the rear part of the seat in the body frame 80 for a wheelchair according to the present embodiment; and (c) the support structure 14 is constituted by the coupling pipe 71 and the coupling rod 72 in the first embodiment, while the support structure 82 is constituted by flat bars 87 and 88 in the body frame 80 for a wheelchair according to the present embodiment. The other structures are the same as those of the body frame 10 for a wheelchair according to the first embodiment.

The seat frame 81 includes a pair of seat rails 84 and 85. The seat rails 84 and 85 are extended in a longitudinal direction along upper bones 17 and 18, respectively. A seat member is attached to the seat rails 84 and 85 so that the forward part of the seat of the wheelchair is constituted.

In the present embodiment, the seat member is attached to hind upper bones 30 and 37 of the main frame 11 so that the rear part of the seat of the wheelchair is constituted. When the user sits on the wheelchair, a portion from a thigh to a knee of the user is supported on the seat rails 84 and 85 and a portion from the thigh to a hip of the user is supported on the hind upper bones 30 and 37. In the present embodiment, the hind upper bones 30 and 37 also serve as members for dividing the seat.

In the present embodiment, the seat rails 84 and 85 are supported on a receiving tool 86 in the same manner as in the body frame 10 for a wheelchair according to the first embodiment. The receiving tool 86 is fixed to the upper bones 17 and 18. The seat rails 84 and 85 are supported on the receiving tool 86, and at the same time, are disposed on the side of the upper bones 17 and 18. In FIG. 15, for simplicity, only the receiving tool 86 provided on the upper bone 17 is shown. Actually, the receiving tool 86 is also provided on the upper bone 18.

In the same manner as in the body frame 10 for a wheelchair according to the first embodiment, the receiving tool 86 is constituted by a rubber, a resin or the like in addition to a metal such as an aluminum alloy. Since the seat rails 84 and 85 are supported on the receiving tool 86, they do not come in contact with the upper bones 17 and 18. A large number of receiving tools 86 may be provided in a longitudinal direction.

Figure 16:
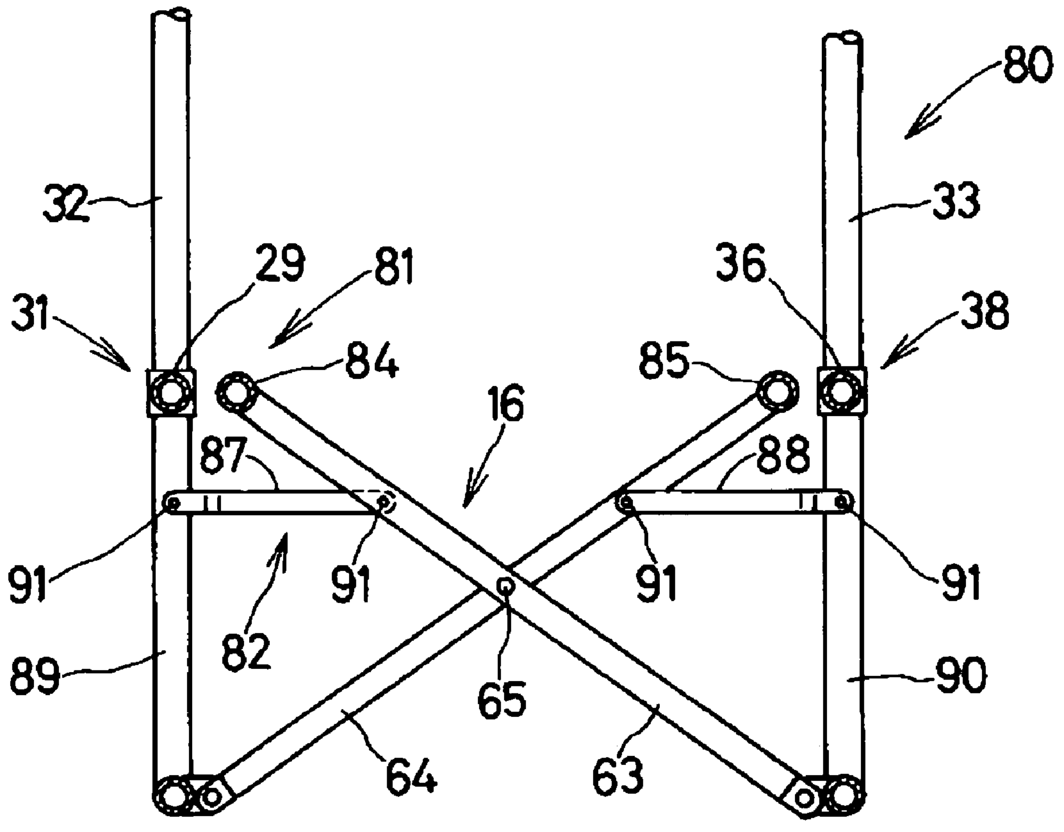
FIG. 16 is a sectional view taken along XVI-XVI in FIG. 15.

FIG. 16 shows the construction of the support structure 82. The support structure 82 includes a pair of flat bars 87 and 88 as shown in FIG. 16. The flat bars 87 and 88 have the same shape and structure and are disposed symmetrically. The flat bar 87 (a first coupling rod) couples a cross member 63 to the main frame 11. More specifically, both ends of the flat bar 87 are coupled to the middle part of the cross member 63 and a reinforcement 89 provided on the main frame 11 by using a pin 91, respectively. In the present embodiment, particularly, the flat bar 87 is bent in a middle part thereof in such a manner that both ends of the flat bar 87 can be coupled to the reinforcement 89 and the cross member 63.

The other flat bar 88 (a second coupling rod) couples a cross member 64 to the main frame 11. More specifically, both ends of the flat bar 88 are coupled to the middle part of the cross member 64 and a reinforcement 90 provided on the main frame 11 by using the pin 91, respectively. In the same manner as the flat bar 87, the flat bar 88 is bent in a middle part thereof in such a manner that both ends of the flat bar 88 can be coupled to the reinforcement 90 and the cross member 64.

The reinforcements 89 and 90 are constituted by a pipe member formed of a metal such as an aluminum alloy. The reinforcement 89 is disposed in such a manner that the upper bone 17 (more specifically, a fore upper bone 29) and a lower bone 19 can be laid. The reinforcement 90 is disposed in such a manner that the upper bone 18 (more specifically, a fore upper bone 36) and a lower bone 20 can be laid. Consequently, the stiffness of the main frame 11 can be enhanced. The reinforcements 89 and 90 may be omitted. If the reinforcements 89 and 90 are omitted, the flat bars 87 and 88 are coupled to the other portions of the main frame 11.

Also in the body frame 80 for a wheelchair according to the present embodiment, when the hind upper bones 30 and 37 fall downward through hinge structures 31 and 38, the back frame 12 is also inclined rearward. The rear part of the seat sinks, and furthermore, the back is inclined rearward. In the same manner as in the body frame 10 for a wheelchair according to the first embodiment, furthermore, the cross angle of the cross members 63 and 64 constituting the cross braces 15 and 16 is changed so that distances in a transverse direction between the upper bones 17 and 18, the lower bones 19 and 20 and the seat rails 84 and 85 which are positioned on left and right are varied. By the change in the cross angle of the cross members 63 and 64, the body frame 80 is folded in the transverse direction.

By the support structure 82, the positional relationship of the seat frame 81 with the main frame 11 is held. The seat frame 81 is prevented from being freely displaced with respect to the main frame 11. Therefore, the body frame 80 can easily be folded. The cross braces 15 and 16 are provided before the hinge structures 31 and 38. The structure (reclining structure) for causing the user of the wheelchair to lie down and the structure (the folding structure) for implementing the fold of the wheelchair are constituted separately and independently. The folding structure and the reclining structure can be constituted easily and inexpensively, respectively. There is an advantage that the manufacturing cost of the body frame 80 can be reduced.

In the body frame 80 for a wheelchair according to the present embodiment, thus, the back is inclined rearward while the rear part of the seat sinks downward. The user of the wheelchair can lie down without losing the posture of the user. The cross braces 15 and 16 are disposed. Therefore, the wheelchair can be folded. Since the wheelchair is folded to be compact, it can easily be loaded onto a car or the like.

In the body frame 80 for a wheelchair according to the present embodiment, particularly, the support structure 82 is constituted by the flat bars 87 and 88. The construction for maintaining the positional relationship between the main frame 11 and the seat frame 13 is very simple. Therefore, there is an advantage that the support structure 82 is constituted more inexpensively.

In the present embodiment, the hinge structures 31 and 38 are employed. In the same manner as in the first embodiment, therefore, the hind upper bones 17 and 18 are not twisted with respect to the fore upper bones 29 and 36 but are accurately rotated around a coupling pin 41. When the rear part of the seat sinks and the back is inclined rearward, the body frame 80 is not twisted. The body frame 80 has an advantage that the user of the wheelchair can lie down without any anxiety. In place of the hinge structures 31 and 38, it is also possible to employ another hinge structure, for example, a clevis connector which has conventionally been employed generally.

In the present embodiment, the seat rails 84 and 85 and the cross braces 15 and 16 are directly coupled to each other. The seat rails 84 and 85 may include the inserting pipe (the reference numeral 60 in FIG. 10) and the inserted rod (the reference numeral 61 in FIG. 10) in the same manner as in the first embodiment. In the case in which such a construction is employed, the seat rails 84 and 85 are rotated in order to offset a change in the cross angle of the cross members 63 and 64 when the cross angle of the cross members 63 and 64 is changed. Also in the case in which a seat member is fixed to the seat rails 84 and 85, the seat member can be prevented from being strongly pulled or loosened.

The above description is only illustrative and various changes can be made without departing from the scope of the present invention.

What is claimed is:

1. A body frame for a wheelchair comprising:

a main frame having a pair of upper bones provided opposite to each other in a transverse direction and extended in a longitudinal direction and a pair of lower bones provided in parallel with the upper bones below the upper bones;

a seat frame having a pair of seat rails provided along the upper bones and constituting a seat by an attachment of a seat member;

a back frame having a pair of back rails provided on rear ends of the upper bones and constituting a back by an attachment of the seat member;

a cross brace including a pair of cross members, one of the cross members having a pair of ends, one of the ends coupled to a predetermined portion of one of the seat rails and the other end coupled to a predetermined portion of one of the lower bones and the other cross member having a pair of ends, one of the ends coupled to a predetermined portion of the other seat rail and the other end coupled to a predetermined portion of the other lower bone, the mutual cross members being coupled rotatably in centers thereof and being thus formed like X; and a support structure for supporting the seat frame with respect to the main frame in order to maintain a positional relationship of the seat frame with the main frame, each of the upper bones being divided into a fore upper bone and a hind upper bone and the hind upper bone being coupled to the fore upper bone through a first hinge structure in order to be freely inclined to the fore upper bone, each of the seat rails being divided into a fore seat rail and a hind seat rail and the hind seat rail being coupled to the fore seat rail through a second hinge structure in order to be freely inclined to the fore seat rail, and the cross brace being disposed before both the first hinge structure and the second hinge structure.

2. The body frame for a wheelchair according to claim 1, wherein the first hinge structure includes a front block provided on a rear end of the fore upper bone, a back block provided on a front end of the hind upper bone, and a coupling pin for coupling both of them, an engagement shaft portion protruded along a rotating axis of the hind upper bone is formed on either the front block or the back block, an engagement dent is provided along the rotating axis on either the remaining front block or the remaining back block, and the engagement shaft portion is fitted in the engagement dent in a rotatable state in a direction of the rotating axis.

3. The body frame for a wheelchair according to claim 2, wherein the front block and the back block are coupled to each other like a shiplap along the rotating axis.

4. The body frame for a wheelchair according to claim 1, wherein a rotating axis of the first hinge structure is coincident with that of the second hinge structure.

5. The body frame for a wheelchair according to claim 1, wherein the support structure has:

a coupling pipe provided in a vertical direction and coupled to the lower bone; and a coupling rod inserted through the coupling pipe and coupled to the seat rail at an upper end thereof.

6. The body frame for a wheelchair according to claim 1, wherein a portion of the seat rail to be coupled to the cross brace includes an inserting pipe and an inserted rod to be inserted through the inserting pipe, and the inserting pipe is constituted to be rotated around an axis of the inserted rod.

7. A body frame for a wheelchair comprising:

a main frame having a pair of upper bones provided opposite to each other in a transverse direction and extended in a longitudinal direction and a pair of lower bones provided in parallel with the upper bones below the upper bones;

a seat frame having a pair of seat rails provided along a forward part of the upper bones and constituting a forward part of a seat by an attachment of a seat member;

a back frame having a pair of back rails provided on rear ends of the upper bones and constituting a back by an attachment of a seat member;

a cross brace including a pair of cross members, one of the cross members having a pair of ends, one of the ends coupled to a predetermined portion of one of the seat rails and the other end coupled to a predetermined portion of one of the lower bones and the other cross member having a pair of ends, one of the ends coupled to a predetermined portion of the other seat rail and the other end coupled to a predetermined portion of the other lower bone, the mutual cross members being coupled rotatably in centers thereof and being thus formed like X; and a support structure for supporting the seat frame with respect to the main frame in order to maintain a positional relationship of the seat frame with the main frame, each of the upper bones being divided into a fore upper bone constituting the forward part of the upper bone and a hind upper bone constituting a rear part of the seat by an attachment of a seat member, and the hind upper bone being coupled to the fore upper bone through a hinge structure in order to be freely inclined to the fore upper bone, and the cross brace being disposed before the hinge structure.

8. The body frame for a wheelchair according to claim 7, wherein the hinge structure includes a front block provided on a rear end of the fore upper bone, a back block provided on a front end of the hind upper bone, and a coupling pin for coupling both of them, an engagement shaft portion protruded along a rotating axis of the hind upper bone is formed on either the front block or the back block, an engagement dent is provided along the rotating axis on either the remaining front block or the remaining back block, and the engagement shaft portion is fitted in the engagement dent in a rotatable state in a direction of the rotating axis.

9. The body frame for a wheelchair according to claim 8, wherein the front block and the back block are coupled to each other like a shiplap along the rotating axis.

10. The body frame for a wheelchair according to claim 7, wherein the support structure includes a first coupling rod for coupling a middle part of one of the cross members to the main frame, and a second coupling rod for coupling a middle part of the other cross member to the main frame, and both ends of each of the coupling rods are rotatably coupled to each of the cross members and the main frame.

* * * * *